Sept. 13, 1949.   M. L. MAGES   2,481,937
MAGNETIC TESTING SYSTEM
Filed June 21, 1943   2 Sheets-Sheet 2
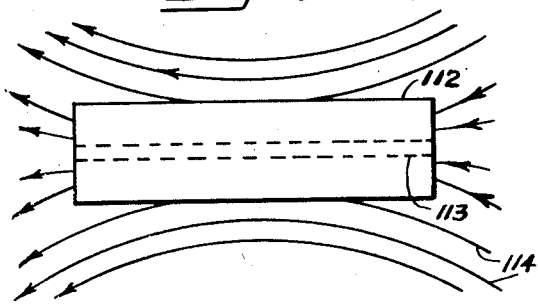
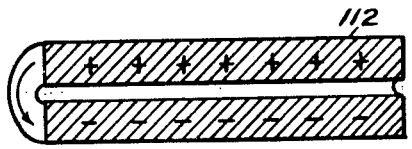
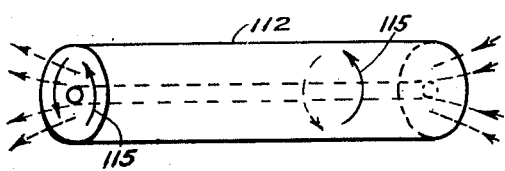
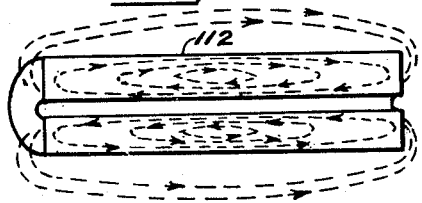
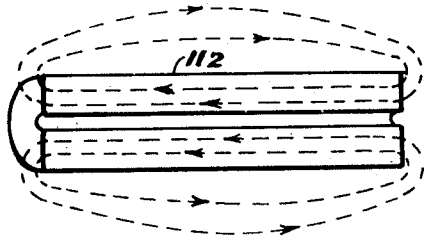
Inventor
Norris L. Mages
by Charles Hill
Attys Patented Sept. 13, 1949

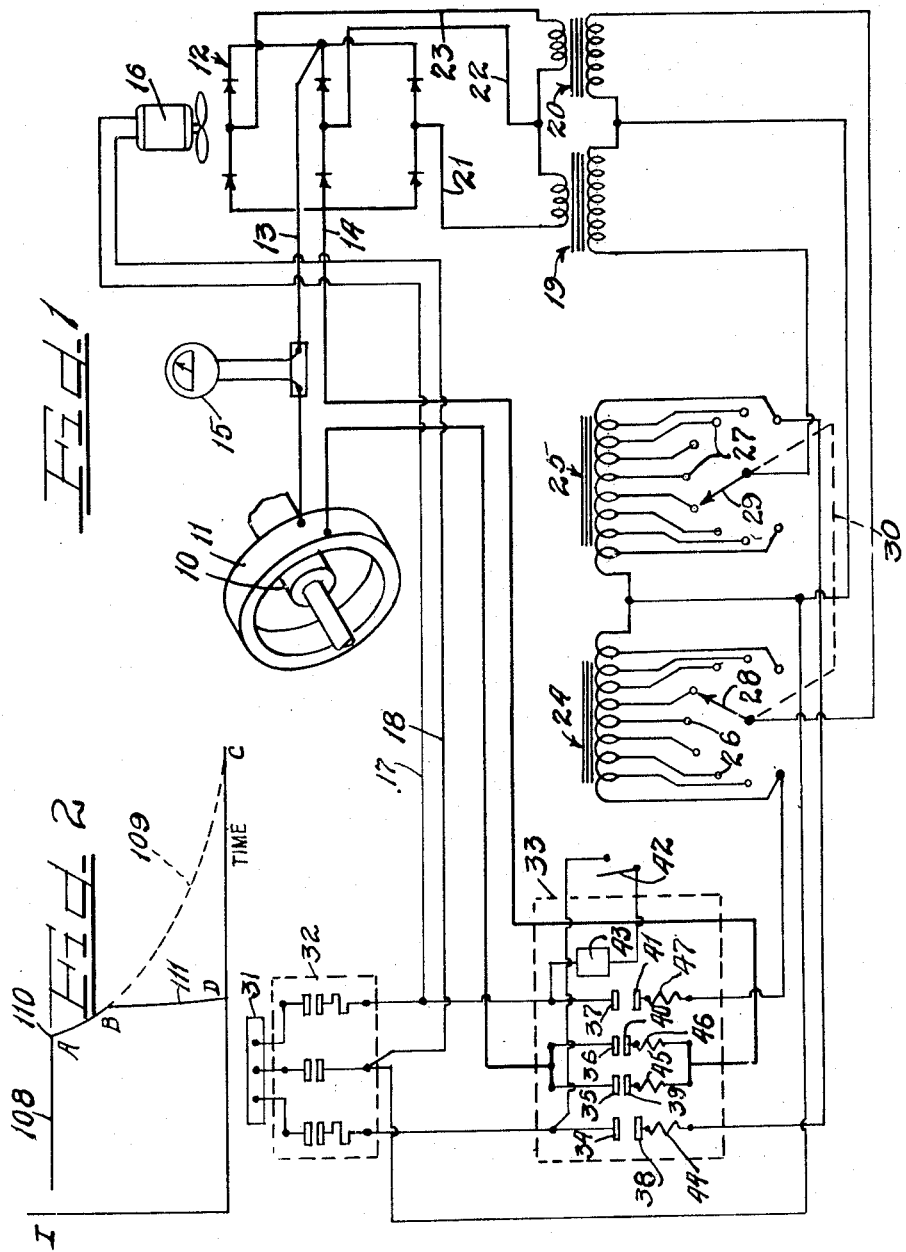

2,481,937

UNITED STATES PATENT OFFICE 2,481,937

MAGNETIC TESTING SYSTEM

Morris L. Mages, Chicago, Ill., assignor to Magnaflux Corporation, Chicago, Ill., a corporation of Delaware Application June 21, 1943, Serial No. 491,598

8 Claims. (Cl. 175—335)

This invention relates to a magnetic testing system and more particularly to a device for magnetizing a magnetizable metal article which is to be dusted with paramagnetic particles for the purpose of determining flaws or other defects.

One of the principal methods of testing manufactured articles and other magnetizable metal objects for the presence of flaws in the form of minute surface cracks or sub-surface defects is to magnetize the object and then dust the surface of the same with paramagnetic particles. If there is any pronounced concentration of paramagnetic particles at any point over the surface, a flaw is indicated at that point. The reason for this is that the leakage flux at the crack causes a concentration of paramagnetic particles at that point. Since the test is negative in character (i. e. the absence of any congregation of paramagnetic particles indicates an object which is free of flaws) it is extremely important that the objects be properly and uniformly magnetized.

There are two general methods employed in tests of this kind. One is to magnetize the article to be tested, and while it is still retained in the magnetic field paramagnetic particles are deposited on the surface thereof. The second method is to magnetize the article, remove it from the presence of the magnetic field, and then dust powder on the surface. In this latter method the residual magnetism of the object being tested, after it has once been magnetized, is used. The present invention relates to this latter type of test.

It will presently be explained that when a magnetic field is established by an electric current, this current must be interrupted in such a manner as to have a very rapid decay in order to provide the piece with sufficient residual magnetism to give a worthwhile test.

It is an object of the present invention to provide a magnetic testing system having a magnetizing circuit carrying high amperage current which may be interrupted with moderate size apparatus and in which the current interruption is characterized by a very rapid decay.

It is a further object of the present invention to provide a novel magnetizing circuit and system for magnetic testing equipment.

A still further object of the present invention is to provide a magnetizing circuit in which a double current break is provided.

Another object of the present invention is to provide a novel magnetizing circuit fed through a transformer in which the primary circuit is first interrupted and immediately thereafter the secondary circuit is interrupted.

Another and further object of the present invention is to provide a direct current magnetizing circuit fed from a rectifier which in turn is connected to the secondary winding of a power transformer and in which the primary circuit of the transformer is first interrupted and immediately thereafter the output circuit of the rectifier is interrupted.

Another and still further object of the present invention is to provide a novel magnetic testing system in which the magnetizing circuit thereof has substantially an instantaneous interruption of current flowing therein.

Still another and further object of the present invention is to provide novel magnetic testing apparatus, including a novel method and means for magnetizing a magnetizable object to be tested for flaws or other defects.

The novel features which I believe to be characteristic of my invention are set forth with particularity in the appended claims. My invention itself, however, both as to its organization, manner of construction and method of operation, together with further objects and advantages thereof, can best be understood by reference to the following description, taken in connection with the accompanying drawings, in which:

Figure 1 is a circuit diagram of one embodiment of the present invention;

Figure 2 is a graph showing the nature of the current decay in the magnetizing circuit brought about by a double break; and Figures 3, 4, 5, 6 and 7 are diagrammatic illustrations of the flux and current distribution in a specimen; Figures 3 and 7 being illustrations of the flux distribution when no eddy currents are present, and Figures 4, 5 and 6 being illustrative of the current and flux distribution when eddy currents are present.

Referring now to Figure 1, there is illustrated therein an object 10 which is to be inspected for flaws or other defects. This object 10 is paramagnetic in character and is to be magnetized and then dusted with paramagnetic powder for the purpose of determining whether there is any special concentration of this powder which would be brought about by the presence of any minute crack or other surface or sub-surface defect.

The object 10 is to be placed inside of a magnetizing coil 11, and as will presently be explained in detail, a heavy current is arranged to flow through this magnetizing coil 11. This causes longitudinal magnetization of the object 10, and will show up any defect which is generally transversely disposed with reference to the longitudinal axis of the part.

The magnetizing coil 11 is energized from a three phase rectifier 12 through conductors 13 and 14. An ammeter 15 is preferably provided in the energization circuit for the purpose of indicating the flow of current therethrough. A fan 16 is preferably provided to cool the rectifier 12, and this fan is energized through conductors 17 and 18 in a manner presently to be described.

In order to supply current to the three phase rectifier 12, a pair of power transformers 19 and 20 are provided and are connected in what is generally referred to as an open delta circuit for supplying alternating current to the three phase rectifier through conductors 21, 22 and 23.

The two power transformers 19 and 20 in turn are supplied by a pair of autotransformers 24 and 25 which serve to regulate the voltage supplied to the power transformers 19 and 20 by means of taps generally designated by the reference numerals 26 and 27. The autotransformer 24 is provided with a movable contact arm 28 and autotransformer 25 is provided with a movable contact arm 29. As indicated by the dotted line 30, the movable contact arms 28 and 29 are mechanically interlocked so that the arms 28 and 29 move in unison. When the arm 28 is in its extreme right-hand position, the arm 29 is in its extreme left-hand position.

Current to the autotransformers 24 and 25 is fed from any suitable three-phase source of alternating current through a terminal box 31, a disconnect switch 32 and a contactor 33. The contactor 33 is provided with four stationary contacts 34, 35, 36 and 37 and four movable contacts 38, 39, 40 and 41 which are arranged to engage contacts 34 to 37 respectively. The contacts 38 and 41 are employed to open two of the three line wires, while the contacts 39 and 40 are arranged to open or close the energization circuit of the magnetizing coil 11. More specifically, contacts 39 and 40 are connected together and are also connected to conductor 14 from the three phase rectifier 12. Stationary contacts 35 and 36 are connected together and are also connected to the magnetizing coil 11 as shown.

The contactor 33 itself may be operated by means of a foot switch 42 which energizes the contactor coil 43 from one phase of the three phase supply line.

The disconnect switch 32 disconnects the entire apparatus from the three phase supply circuit.

For a reason which will presently be apparent, contacts 39 and 40 are arranged to close at a slight instant of time before the closing of contacts 38 and 41, and are also arranged to open after contacts 38 and 41. This may be done in any suitable manner well known to those skilled in the art by properly spacing contacts 38 and 41 with respect to stationary contacts 34 to 37 respectively. When a circuit breaker is provided with a plurality of groups of contacts, one group of which is arranged to make first and break last with respect to another group, the contacts are usually individually spring biased and for the purpose of the present diagrammatic illustration, such springs are indicated by the reference characters 44 to 47 which are associated with contacts 38 to 41 respectively. This difference in the timing of the opening and closing of contacts 39 and 40 with respect to contacts 38 and 41 is possible because of the springs 44 to 47 which serve to apply pressure between the contact points and to take up the difference in the spacing.

Having now explained that the make and break switch in the rectified circuit of the three phase rectifier is arranged to close ahead of the closure of the make and break switches in the primary circuit, and to break last, the reason for this will be apparent from an inspection of Figure 2. Assume that the current flowing through the coil 11 is represented by the horizontal line 108 of the graph—the ordinates being current values and the abscissae being units of time. If the primary circuit only were broken, such as would be effected by opening of contacts 38 and 41, the current flowing through the test coil 11 would decay in the manner generally indicated by the dotted line 109, the break occurring at the point 110. As has previously been pointed out, this is an undesirable current decay characteristic, since it frequently happens that under such conditions the object is not properly magnetized.

It has been found that if a double break is provided, and more specifically if the primary circuit is broken first by opening contacts 38 and 41 and then a very slight instant of time later the secondary circuit is broken by opening contacts 39 and 40, a very rapid current decay characteristic is provided such as is indicated by the flow line 111 in the graph of Figure 2. More specifically, when the primary circuit is open at the point 110, the current flowing through the magnetizing coil 11 starts to decay along the portion of the curve from A to B. Upon opening of the secondary circuit the current decay is very abrupt and follows the line from B to D, rather than the line from B to C as it would have done if only the primary circuit were open.

It has been found that the residual magnetism in the piece to be tested is more constant, reliable and uniform when the current is interrupted by a double break as hereinbefore described than is the case when only the primary or the secondary alone are interrupted.

The interval of time between the first break and the second break is very small and preferably is on the order of a few ten-thousandths of a second. This interval of time, however, may be adjusted by suitably varying the relative spacing of the contact elements of the circuit breaker 33. Due to the fact that several thousand amperes of current flow in the secondary circuit, it is, of course, desirable to open the primary circuit first where the current flow is much smaller.

An explanation of the phenomenon which makes it desirable to have a double break will now be made.

Assume that we are magnetizing a cylindrical specimen having an axial hole therethrough, and which specimen is located at the center of a magnetizing coil. Under the steady state condition the flux lines through the specimen take the path as shown in Figure 3. When the current is broken suddenly, the magnetic field collapses toward the coil winding and thereby generates an eddy current which flows around the part in the direction as shown by the arrows 115 in Figure 4 of the drawings. Now, if this sheet of current is looked at in longitudinal cross-section (i. e., if the cylinder is cut in half lengthwise) it will be seen that the eddy current really forms a coil of one turn as is shown in Figure 5 of the drawings. This coil of one turn will magnetize the part as shown in Figure 6 of the drawings. This is distinctly different from the nature of the magnetization of the cylinder under the condition of no eddy current as is shown by the sectional view in Figure 7. In the surface of the part in Figure 6, the flux is in the opposite direction to that in Figure 7. It is important to note that in Figure 6 the flux density at the surface is much greater than in Figure 7 due to the fact that the path of the flux is entirely within the iron. For this reason it will at once be apparent that grinding cracks and other similar defects are shown much more easily when a specimen is magnetized in such a manner as to produce a magnetization of the specimen having a flux distribution of the type shown in Figure 6. It will further be noted that the condition of a fast break, as shown in Figure 6, will show up as producing a weaker external field for the same applied ampere turns. As a matter of fact, however, the degree of "internal circular magnetization" can be judged by the degree of lowering of the external pole strength in comparison with a slow break.

The above explanation shows why it is desirable to obtain a fast break in the magnetizing circuit of a piece of magnetic test equipment.

It has further been found in practice by breaking the primary circuit of the transformer feeding the rectifier immediately before the coil circuit is broken by the secondary breaker that not only the arcing of the contacts breaking of the secondary circuit is much less, but that also a much faster decay of direct current was obtained in this way than was possible by breaking the direct current circuit alone. The reason for this is that once the driving voltage is cut off by the A. C. breaker, the decaying D. C. is broken very easily and quickly by the secondary breaker.

While I have shown a particular embodiment of my invention, it will, of course, be understood that I do not wish to be limited thereto since many modifications may be made and I therefore contemplate by the appended claims to cover all such modifications as fall within the true spirit and scope of my invention.

I claim as my invention:

1. A magnetizing circuit comprising a transformer having a high voltage primary circuit arranged to be connected to a source of alternating current and a low voltage secondary circuit, a rectifier in said secondary circuit having an output circuit for supplying unidirectional current, coil means in the output circuit of said rectifier arranged to magnetize an object, interrupting means for interrupting said primary circuit and said rectifier output circuit in successive order to effect a rapid current decay in said output circuit and redistribute the magnetic flux in said object.

2. A magnetizing circuit comprising a transformer having a high voltage primary circuit arranged to be connected to a source of alternating current and a low voltage secondary circuit, a rectifier in said secondary circuit having an output circuit for supplying unidirectional current, coil means in the output circuit of said rectifier arranged to magnetize an object, interrupting means for interrupting said output circuit and before the current in the primary circuit decays to zero interrupting the output circuit of said rectifier to effect rapid current decay in said output circuit and redistribute the magnetic flux in said object.

3. A magnetizing circuit comprising a transformer having a high voltage primary circuit arranged to be connected to a source of alternating current and a low voltage secondary circuit, a rectifier in said secondary circuit having an output circuit for supplying unidirectional current, coil means in the output circuit of said rectifier arranged to magnetize an object, interrupting means for interrupting said primary circuit, and momentarily after said primary circuit is interrupted, interrupting said rectifier output circuit to effect rapid current decay in said output circuit and induce appreciable eddy currents in said object to effect a redistribution of the magnetic flux therein.

4. An apparatus for magnetizing a magnetizable body, the combination comprising transformer means having a relatively high voltage primary and a low voltage secondary, a multiple contact circuit breaker, said primary being connected through at least one contact of said circuit breaker to a source of alternating current, means for association with the object to magnetize the same when current flows through said means, said secondary being connected through at least one of the other contacts of said circuit breaker to said means, said second mentioned contact of said circuit breaker being arranged to open in a period of the order of a few ten thousandths of a second after said first contact opens as said circuit breaker is opened to effect a sudden interruption of the current flow in said means to redistribute the magnetic flux in said object.

5. An apparatus for magnetizing a magnetizable body, the combination comprising transformer means having a relatively high voltage primary and a low voltage secondary, a multiple contact circuit breaker, said primary being connected through at least one contact of said circuit breaker to a source of alternating current, rectifier means connected to said secondary and having an output circuit for supplying unidirectional current, means for association with the object to magnetize the same when current flows through said means, the output circuit of said rectifier means being connected to said first means through at least one of the other contacts of said circuit breaker, said second mentioned contact of said circuit breaker being arranged to open momentarily after said first contact as said circuit breaker is opened to effect rapid decay of current in said output circuit and redistribution of the magnetic flux in said object.

6. The method of operating a magnetizing unit having a direct current secondary circuit and an alternating current primary circuit to magnetize a magnetizable object comprising the steps of energizing the alternating current primary circuit to cause direct current flow in the secondary circuit to set up a magnetic field about the object, interrupting the primary circuit to cause said direct current in said secondary circuit to decay at a relatively slow rate, and at a closely spaced period of time thereafter interrupting said secondary circuit to cause a very rapid decay of the current flow therein to set up eddy currents in said object and redistribute the magnetic flux therein.

7. The method of operating a magnetizing unit having a direct current secondary circuit and an alternating current primary circuit to magnetize a magnetizable object comprising the steps of energizing the alternating current primary circuit to cause direct current flow in the said secondary circuit and to set up magnetic field about said object, interrupting the primary circuit to cause the current in said secondary circuit to decay at a relatively slow rate, and a few ten-thousandths of a second later interrupting the secondary circuit to cause a very rapid decay of the current flowing therein to set up eddy currents in said object and redistribute the magnetic flux therein.

8. In the method of detecting flaws in a magnetizable object by the use of a magnetizing coil wound thereabout, the steps of causing current flow through said coil to magnetize said object, causing said current flow to decrease in value at a relatively slow rate for a predetermined period of time, and then suddenly interrupting said current flow to generate eddy currents in the said object and to redistribute the magnetic flux therein.

MORRIS L. MAGES.

REFERENCES CITED

The following references are of record in the file of this patent:

UNITED STATES PATENTS

| Number | Name | Date |
| --- | --- | --- |
| 1,754,948 | Hatch | Apr. 15, 1930 |
| 2,125,628 | Fredrickson | Aug. 2, 1938 |
| 2,136,375 | DeForest | Nov. 15, 1938 |
| 2,221,576 | Dawson | Nov. 12, 1940 |
| 2,247,745 | Brader | July 1, 1941 |
| 2,352,371 | Clarke | July 27, 1944 |

OTHER REFERENCES

The Engineer, London, pp. 178–179, Feb. 26, 1943.